United States Patent [19]

Smith

[11] Patent Number: 4,876,475
[45] Date of Patent: Oct. 24, 1989

[54] BRUSH HOLDER WITH PLASTIC CUP TO RETAIN BIASING SPRING

[75] Inventor: Richard A. Smith, Chippewa Pass, Wis.

[73] Assignee: Sunbeam Corporation, Downers Grove, Ill.

[21] Appl. No.: 187,149

[22] Filed: Apr. 28, 1988

[51] Int. Cl.$^4$ ............................................. H02K 13/00
[52] U.S. Cl. ................................... 310/239; 310/242; 310/245
[58] Field of Search ............... 310/238, 239, 242, 245, 310/247, 248, 253, 233; 29/597; 439/18, 23, 28, 29

[56] References Cited

U.S. PATENT DOCUMENTS

| | | | |
|---|---|---|---|
| 3,308,321 | 3/1967 | Provost, Jr. | 310/247 |
| 3,339,098 | 8/1967 | Burrows | 310/239 |
| 3,784,856 | 1/1974 | Preston | 310/239 |
| 3,955,113 | 5/1976 | Hillyer | 310/245 |
| 4,074,162 | 2/1978 | Parzych | 310/245 |
| 4,266,155 | 5/1981 | Niemela | 310/239 |
| 4,297,605 | 10/1981 | Tak | 310/242 |
| 4,553,057 | 11/1985 | Saeed | 310/245 |

FOREIGN PATENT DOCUMENTS

| | | | |
|---|---|---|---|
| 1233483 | 2/1967 | Fed. Rep. of Germany | 310/239 |
| 2165526 | 7/1973 | Fed. Rep. of Germany | 310/239 |
| 2712721 | 9/1978 | Fed. Rep. of Germany | 310/242 |

Primary Examiner—R. Skudy
Attorney, Agent, or Firm—Mason, Kolehmainen, Rathburn & Wyss

[57] ABSTRACT

A brush assembly for a commutator type electrical machine includes a biasing spring for biasing a carbon brush toward a commutator. The brush assembly also includes a brush guide having a passageway portion formed to guide the carbon brush. A spring retainer is slidingly received within the brush guide and is disposed between the carbon brush and the biasing spring. An enlarged portion of the spring retainer cooperates with an annular shoulder formed within the brush guide to form a stop surface to limit rectilinear movement of the spring retainer within the brush guide and consequently the biasing spring when the brush is substantially worn out.

18 Claims, 1 Drawing Sheet

BRUSH HOLDER WITH PLASTIC CUP TO RETAIN BIASING SPRING

BACKGROUND OF THE INVENTION

This invention relates to a brush assembly for use with a commutator type electric machine, and more specifically, to a brush assembly which is spring biased against the commutator, wherein movement of the biasing spring is limited to prevent contact with the commutator when the brush is substantially worn out.

DESCRIPTION OF THE PRIOR ART

Carbon brush assemblies for commutator type electrical machines are generally old and well-known in the art. Various methods are known for restraining the biasing spring in the brush assembly to prevent it from contacting the commutator when the brush has substantially worn out. Examples of such brush assemblies are disclosed in U.S. Pat. Nos. 3,308,321; 3,339,098; 3,784,856; 3,955,113; 4,074,162; 4,266,155 and 4,553,057.

In U.S. Pat. No. 3,308,321 to Provost, a brush assembly is disclosed having an elongated brush guide with a longitudinal bore for receiving a cylindrical retainer. The retainer is disposed coaxially within the brush guide and extends outwardly from one end of the brush guide. The retainer has a wall with an aperture at one end nearest the commutator for receiving a carbon brush and allowing it to pass therethrough for contact with the commutator of an electrical machine. The wall forms a stop surface. An elongated cylindrical carbon brush is slidingly received within the retainer. The carbon brush has an enlarged diameter sleeve fixedly disposed about the center of the brush. The brush is received in the retainer such that one end extends through the aperture in the end of the retainer. A biasing spring seats against the enlarged diameter sleeve of the brush and the cap screw and biases the carbon brush toward the commutator. The diameter of the sleeve disposed on the brush is greater than the diameter of the aperture disposed at the end of the retainer. As the brush wears out the enlarged diameter sleeve formed as a part of the carbon brush moves closer to the aperture until it engages the wall, which acts as a stop surface and restrains further movement of the carbon brush and biasing spring. The other end of the retainer is provided with an outwardly formed annular shoulder which seats against an interior annular shoulder integrally formed within the brush guide. A cap screw closes the end of the brush guide and secures the retainer with respect to the brush guide.

Burrows et al, U.S. Pat. No. 3,339,098 discloses a brush assembly having a brush guide which slidingly receives an elongated carbon brush. The brush is formed with two different cross-sectional areas. Specifically, a forward end of the brush is formed with a rectangular cross section which generally conforms with the rectangular cross-sectional area of the brush guide. The rearward end of the brush is cylindrical. An electrical ring type connector is disposed within the brush guide. The ring portion of the connector receives the cylindrical portion of the brush. A biasing spring for biasing the carbon brush toward the electrical commutator is disposed around the cylindrical portion of the carbon brush and engages the electrical ring type connector at one end. An end cap closes the rearward end of the brush guide. A shank portion of the electrical ring type connector extends outwardly from a slot formed in the top surface of the brush guide. One wall of the slot, which is closest to the commutator, acts as a stop surface to limit the forward movement of the electrical spring type connector, and consequently, the biasing spring when the brush has worn.

Preston U.S. Pat. No. 3,784,856 discloses a brush assembly which includes a brush holder having a generally rectangular cross-sectional area with a pair of oppositely disposed inwardly projecting deformable tabs intermediate one end. The other end of the brush guide is closed. A brush having a generally rectangular cross-sectional area is formed with oppositely disposed slots on the outer surfaces for receiving the deformable tabs. The slots extend along the longitudinal axis of the brush and extend intermediate the rearward end of the brush. One wall of the slot forms a stop surface which engages the deformable tabs when the brush is substantially worn out to prevent rectilinear movement of the brush and consequently the biasing spring with respect to the brush holder. A biasing spring disposed between the closed end of a brush guide and the rearward end of the brush biases the brush toward the commutator.

U.S. Pat. No. 3,955,113 to Hillyer discloses a brush assembly which includes a generally rectangularly shaped brush holder formed with a pair of inwardly facing tabs disposed intermediate one end of the brush holder. The brush holder is closed at the other end with an end cap. A brush is provided with cooperating longitudinal slots for receiving the tabs on oppositely disposed faces. The tabs act as a stop surface for the biasing spring disposed between the end cap and the brush. The biasing spring is formed with a larger cross-sectional area than the cross-sectional area of the brush. Thus, when the brush is worn out, the spring will advance to the forward portion of the brush holder where the tabs will engage the spring and prevent it from contacting the commutator. In alternate embodiment, a brush holder is disclosed having a generally rectangular cross-sectional area. A pair of elongated slots are disposed on opposite faces of the brush holder. A spring is formed having the first couple of turns formed into a pair of oppositely disposed arms which are received into the slots in the brush guide. When the brush wears out, the arm portions of the spring engage the forward wall of the slot, preventing further movement of the spring.

Parzych U.S. Pat. No. 4,074,162 discloses a generally rectangular brush holder closed at one end having a slot on one wall. A biasing spring disposed between the closed end of the brush holder and a carbon brush biases the carbon brush toward the commutator. The spring is formed with an extending hook which protrudes through the slot. When the brush is worn out, the extending hook will contact the end of the slot thus preventing further travel of the spring.

U.S. Pat. No. 4,266,155 to Niemela discloses a brush holder having a generally rectangular cross-sectional area with two oppositely disposed rectangular slots. A brush follower is formed with outwardly extending tabs. The brush follower is slidingly disposed within the brush holder with the tabs received within the slots. The brush holder is closed at one end by an end cap. A carbon brush, received in the open end of the brush holder, seats against the brush follower. A biasing spring, disposed between the end cap and the brush follower, biases the brush toward the commutator. As the outwardly extending tabs of the brush follower engage the forward wall of the slot, further travel of the brush follower and the biasing spring is prohibited.

U.S. Pat. No. 4,553,057 to Saeed discloses another brush assembly wherein a brush guide, closed at one end, is formed with a pair of oppositely disposed longitudinally extending slots. A meal pin is disposed in a transverse bore in the brush. The ends of the pin are received in the longitudinally extending slots in the brush guide. A biasing spring engages the closed end of the brush guide and the brush. Stops are formed at the forward end of the slots in the brush guide. As the transversely disposed metal pin contacts the stops, further movement of the brush and biasing spring is prevented.

The prior art brush assemblies are relatively complicated to manufacture. For example, many of the brush holders require slots (U.S. Pat. Nos. 3,339,098; 3,784,856; 3,955,113; 4,074,162; 4,266,155 and 4,553,057) or tabs (U.S. Pat. Nos. 3,955,113 and 4,074,162) or require specially formed springs. The slots require a separate punching operation and are thus more complicated and expensive to manufacture. The prior art brush assemblies that require specially formed springs increase the manufacturing cost of the brush assembly.

SUMMARY OF THE INVENTION

It is an object of the present invention to provide a brush assembly for a commutator type electrical machine that overcomes the problems associated with the prior art.

It is a further object of the present invention to provide a brush assembly for a commutator type electrical machine that is relatively easy and inexpensive to manufacture.

It is yet another object of the present invention to provide a brush assembly which includes a biasing spring for a commutator type electrical machine wherein the biasing spring is prevented from contacting the commutator even when the carbon brush is substantially worn out.

Briefly, the present invention relates to a brush assembly for use in a commutator type electrical machine. The brush assembly includes a brush guide having a passageway portion formed to guide a carbon brush toward the commutator. A spring retainer is slidingly received within the brush guide. The spring retainer contacts the brush on one end and engages a biasing spring on the other end. An enlarged portion of the spring retainer cooperates with an annular shoulder disposed within the brush guide to form a stop surface to limit rectilinear movement of the spring retainer within the brush guide to prevent the spring from contacting the commutator when the carbon brush is substantially worn out.

BRIEF DESCRIPTION OF THE DRAWING

These and other objects, advantages and novel features of the present invention, will become readily apparent upon consideration of the following detailed description and attached drawing wherein.

DETAILED DESCRIPTION OF THE DRAWING

Figure 1:
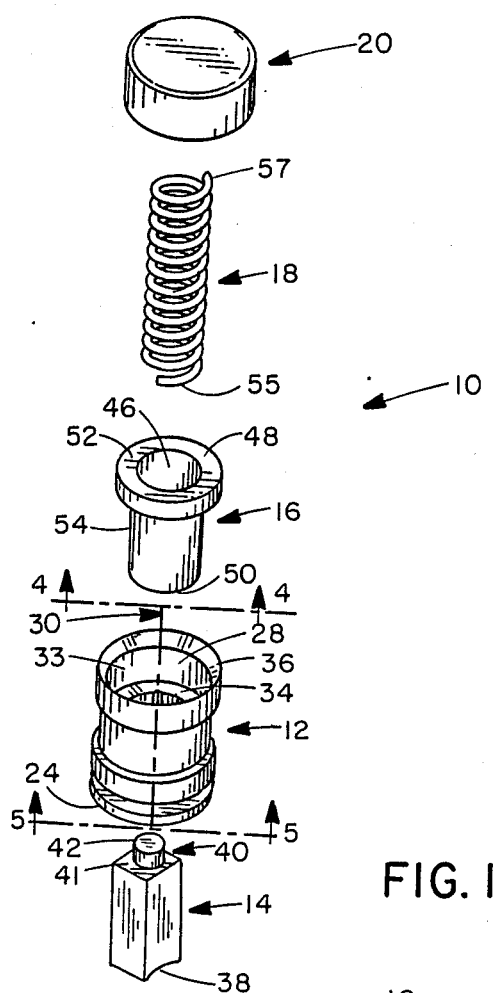
FIG. 1 is an exploded perspective of the brush assembly in accordance with the present invention.

Referring to the drawing and in particular to FIG. 1, a brush assembly, identified by the reference numeral 10, in accordance with the present invention is illustrated. Brush assemblies are utilized in various motors including universal motors utilized in power tools and appliances. The brush assembly in cooperation with a commutator provided on the armature allows for an electrical connection of the rotating armature windings with an external source of electrical power.

The brush assembly 10 includes a brush guide 12, an elongated carbon brush 14, a spring retainer 16, a biasing spring 18 and an end cap 20. As will be described in detail, the above-mentioned components form a brush assembly which prevents the biasing spring 18 from contacting the commutator of an electrical machine when the brush 14 is substantially worn out to prevent damage to the commutator.

The brush assembly 10 is mounted stationary with respect to a frame 22 of an electrical machine so that the carbon brush 14 extends outwardly from the proximal end 24 of the brush assembly 10 and engages the commutator 26. The commutator 26 is generally formed from a plurality of generally flat copper bars 27 connected in a barrel shape. The copper bars 27 are rigidly secured to rotating armature windings (not shown). An external source of electrical power is electrically coupled to the proximal end 24 of the brush guide 12. By way of the carbon brush 14, the external source of electrical power is coupled to the commutator 26, which, in turn, is electrically coupled to the rotating armature windings.

The brush guide 12 is formed from an electrically conductive material and is generally cylindrical in shape. A longitudinal bore 28 is provided in the brush guide 12. The brush guide 12, when properly inserted into the machine frame 22, has its longitudinal axis 30 generally perpendicular to an armature axis 31 of the machine.

The longitudinal bore 28 in the brush guide 12 has a nonuniform cross-sectional area and defines a passageway portion 32 at the proximal end 24 of the brush guide 12 which slidingly receives the carbon brush 14 and a pocket portion 33 at the distal end 36 for slidingly receiving the spring retainer 16. An annular shoulder 34, formed within the bore 28 intermediate the distal end 36 of the brush guide 12, acts as a stop surface to limit rectilinear movement of the spring retainer 16 and biasing spring 18 to prevent them from contacting the commutator 26 when the brush 14 is substantially worn out.

The passageway portion 32 has a generally rectangular bore 35 in the passageway portion 32 of the brush guide 12. As will be described, the brush 14 is formed with a generally rectangular cross section. Accordingly, rotation of the brush 14 with respect to the brush guide 12 is prevented.

The brush 14 is generally formed from carbon into an elongated rectangular member. One end 38 of the brush 14 extends outwardly from the proximal end 24 of the brush guide 12 and is adapted to contact the commutator 26. Since the brush 14 generally contacts more than one of the copper bars 27 at a time, the end 38 of the brush 14 is generally formed with an arcuate surface to conform to the arcuate surface of the commutator 26. The opposite end 40 of the brush 14 is formed with a generally cylindrical protuberance or boss 42 forming a shoulder 41 surrounding the protuberance 42 on the face 40. The protuberance 42 is disposed coaxially with respect to the axis 30 and is generally perpendicular to the armature axis 31. The protuberance 42 is adapted to extend into and snugly fit into an aperture 49 on one end of the spring retainer 16. After the protuberance 42 is inserted in the aperture 49, it engages the biasing spring 18 disposed within the spring retainer 16.

The spring retainer 16 is generally tubular or cylindrical in shape having an open end 48 and a partially closed end 50. An aperture 49 is provided in the partially closed end 50. The protuberance 42 is adapted to be received into the aperture 49. The aperture 49 is sized to cause a jam or interference fit with the protuberance 42. Thus, after the brush 14 is substantially worn out, the remaining portion of the brush 14 will be held by the spring retainer 16.

The spring retainer 16 is formed with an enlargement or peripheral flange 52 on the open end 48. The peripheral flange 52 is integrally formed with the spring retainer 16 and has a diameter larger than the diameter of the passageway portion 32 of the brush guide 12. The peripheral flange 52 is adapted to be slidingly received within the pocket portion 33 of the brush guide 12 and seat against the annular shoulder 34 within the brush guide 12. Once the peripheral flange 52 is seated against the annular shoulder 34, rectilinear movement of the peripheral flange 52 in a direction toward the commutator 26 is prevented.

The length of the spring retainer 16 is such to allow a smaller diameter portion 54 of the spring retainer 16 to be slidingly received into the passageway portion 32 of the brush guide 12. However, the length of the smaller diameter portion 54 is limited so that when the peripheral flange 52 of the spring retainer 16 seats against the annular shoulder 34 within the brush guide 12, the partially closed end 50 of the spring retainer 16 will not contact the commutator 26.

The biasing spring 18 is formed with a relatively smaller diameter than the diameter of the bore 46 at the open end 48 of the spring retainer 16 to allow the biasing spring 18 to be slidingly received therewithin. The diameter of the spring 18 is also formed such that it is larger than the diameter of the aperture 49 at the partially closed end 50 of the spring retainer 16 to prevent the spring 18 from extending through the spring retainer 16.

One end 55 of the spring 18 seats against the interior of an end wall surface 56 at the partially closed end 50 of the spring retainer 16. The other end 57 of the biasing spring 18 engages a removable end cap 20. The end cap 20 is generally cup shaped and may be formed from a plastic material. The biasing spring 18 urges the spring retainer 16 and the brush 14 outwardly from the passageway portion 32 of the brush guide 12 to provide relatively constant brush pressure against the commutator 26.

Figure 2:
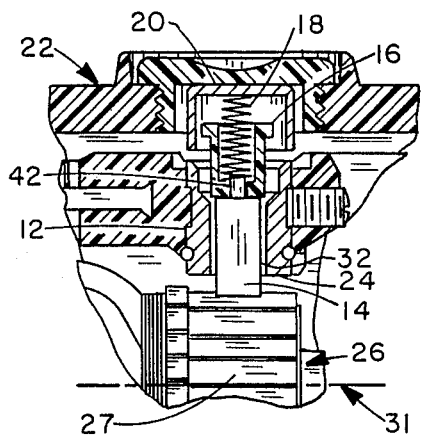
FIG. 2 is a partial sectional view of the brush assembly in accordance with the present invention installed within a commutator type electrical machine illustrating a brush assembly with a relatively new carbon brush.
Figure 3:
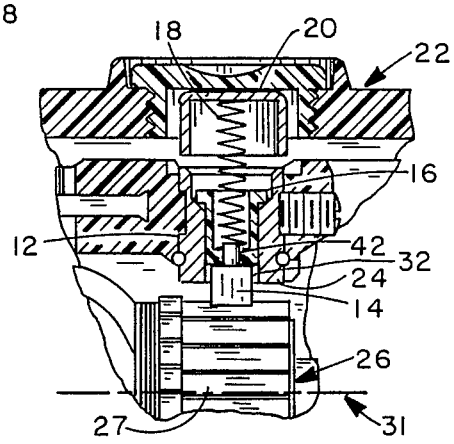
FIG. 3 is a partial sectional view of the brush assembly, similar to the assembly illustrated in FIG. 2, showing the carbon brush in a relatively worn out condition wherein the spring retainer is shown abutted against an annular shoulder formed within the brush guide.
Figure 4:
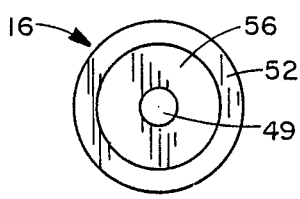
FIG. 4 is an end view of a partially closed end of a spring retainer in accordance with the present invention.
Figure 5:
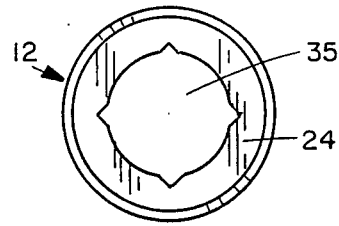
FIG. 5 is an end view of the proximal end of the brush guide in accordance with the present invention.

FIG. 2 illustrates a brush assembly 10 in accordance with the present invention wherein the brush 14 is relatively new. In this position, the peripheral flange 52 of the spring retainer 16 is unrestrained within the pocket portion 33 of the brush guide 12. In FIG. 3 a brush assembly 10 in accordance with the present invention is illustrated showing the position of the components of the brush assembly 10 with a relatively worn out brush 14. In this condition, the peripheral flange 52 of the spring retainer 16 is abutted against the annular shoulder 34 within the brush guide 12 to prevent further rectilinear movement of the spring retainer 16 toward the commutator 26 within the brush guide 12.

By forming the spring 18 with a diameter larger than the diameter of the aperture 49 at the partially closed end 50 of the spring retainer 16, movement of the spring 18 toward the commutator 26 when the brush 14 is substantially worn out is restricted. Thus, it should be clear that once the peripheral flange 52 disposed at the open end 48 of the spring retainer 16 abuts the annular shoulder 34, neither the spring retainer 16 nor the spring 18 will be able to contact the commutator 26 when the brush 14 is substantially worn out.

Obviously, many modifications and variations of the present invention are possible in light of the above teachings. Thus, it is to be understood that, within the scope of the appended claims, the invention may be practiced otherwise than as specifically described hereinabove.

What is claimed and desired to be secured by a Letters Patent is:

1. A brush assembly for use in a commutator type electrical machine comprising;
    an elongated carbon brush having a rectangular cross section and terminating at one end in a shouldered portion surrounding a lengthwise extending protuberance;
    a brush guide having a passageway within which said brush is received, said passageway being formed to guide said brush for lengthwise rectilinear movement and to restrain said brush from rotary movement;
    a coil spring;
    means for mounting said coil spring in a compressed condition with one end received on said protuberance and positioned to urge said brush outwardly from said passageway;
    a spring retainer which is tubular in shape to receive said one end and a portion of said coil spring, said retainer having an open end and a partially closed end;
    an opening formed in said partially closed end of said retainer being large enough to receive said brush protuberance but too small to permit said one end of said coil spring to pass therethrough, said spring retainer being slidable within said passageway; and
    an enlargement on said open end forming a stop to limit sliding movement of said retainer, in said guide, said sliding movement of said retainer permitting said coil spring to urge said brush outwardly from said passageway until said brush is substantially worn at which time said spring retainer arrests further movement of said one end of said spring and said brush.

2. The brush assembly of claim 1 wherein said protuberance on said brush is cylindrical and said opening formed in said partially closed end of said retainer snugly receives said protuberance, said opening in said retainer being defined by an annular shoulder, which on its outer face, abuts against said shouldered portion of said brush, said protuberance extending within said retainer a sufficient distance to engage said coil spring which abuts against the inner face of said annular shoulder.

3. The brush assembly of claim 2 wherein said passageway is rectangular in cross section to snugly receive said brush for sliding movement, said retainer being cylindrical and having a diameter small enough to pass through said passageway, said enlargement on said retainer comprising a peripheral flange on said open end of said retainer, and said flange being greater in diameter than width of said passageway so that retainer may be mostly received within said passageway but will not pass through said passageway.

4. The brush assembly of claim 3 wherein said guide is formed of an electrically conductive material, said means mounting said spring including a removable cap being a cup shape and receiving the end of said coil spring remote from said retainer to compress said spring between said cap and said retainer.

5. A brush assembly for use in an electric motor comprising;
a brush guide having a passageway for slidably supporting an elongated carbon brush for rectilinear movement along an axis generally perpendicular to an armature axis;
said elongated carbon brush having a rectangular cross section and a cylindrical boss extending from one end coaxial with said axis;
an elongated coil spring having one end engaged with said cylindrical boss and being disposed coaxial with said boss;
a cap mounted adjacent one end of the passageway in said brush guide and engaging the other end of said spring to compress said spring; and
a spring retaining tube mounted on said cylindrical boss and having a portion between said spring and said brush, said tube being mounted for limited sliding movement with said brush in said passageway, said tube arresting movement of said one end of said spring through said passageway after said brush is substantially worn out.

6. The brush assembly of claim 5 wherein said guide is generally cylindrical in shape and said passageway therein has a generally rectangular cross section, said tube having diameter equal to less than the smallest cross-sectional width of said passageway, said tube having a radially extending portion on the end of said tube remote from said brush which engages said guide and limits movement of said tube through said passageway.

7. The brush assembly of claim 6 wherein said radially extending portion is a flange which is normal to the axis of said tube.

8. The brush assembly of claim 7 wherein said guide is formed with a cylindrical pocket at said one end of said passageway, an outwardly facing shoulder in said guide extending from the inner end of said cylindrical pocket to said one end of said passageway.

9. The brush assembly of claim 8 wherein said flange engages said outwardly facing shoulder in said guide to limit movement of said tube through said passageway.

10. A brush assembly for use in a commutator type electrical machine comprising;
an elongated brush guide defining a proximal end and a distal end, formed with an annular interior stop surface disposed intermediate the distal end;
a tubular spring retainer formed with an annular flange which is slidingly received within the brush guide for rectilinear movement therewith, wherein said flange is adapted to abut said annular interior stop surface to limit movement of the spring retainer within the brush guide;
an end cap disposed adjacent the distal end of the brush guide;
a biasing spring disposed between the end cap and the spring retainer; and
a brush mechanically coupled to the biasing spring, slidingly received within the brush guide and biased outwardly from the proximal end of the brush guide.

11. The brush assembly as recited in claim 10 wherein said brush guide is formed with an electrically conductive material.

12. The brush assembly as recited in claim 10 wherein said end cap is formed from a plastic material.

13. The brush assembly as recited in claim 10 wherein said brush guide is generally cylindrical in shape.

14. The brush assembly as recited in claim 10 wherein said brush has a generally rectangular cross section and has generally annular protuberance disposed on one end.

15. The brush assembly as recited in claim 10 wherein a longitudinal bore is provided in said spring retainer and is closed at the proximal end defining an end wall.

16. The brush assembly as recited in claim 15 wherein an aperture is provided in said end wall which has a diameter relatively smaller than the diameter of said biasing spring and relatively larger than the diameter of said protuberance.

17. A brush assembly as recited in claim 16 wherein said bore has a diameter relatively larger than the diameter of said biasing spring.

18. A brush guide as recited in claim 10 further including means for preventing rotation of said brush within said brush guide.

* * * * *